UNITED STATES PATENT OFFICE.

JOSEPH C. WEBSTER, OF PHILADELPHIA, PENNSYLVANIA.

SOLDER FOR SOLDERING ALUMINIUM.

SPECIFICATION forming part of Letters Patent No. 707,470, dated August 19, 1902.

Application filed November 16, 1901. Serial No. 82,566. (No specimens.)

*To all whom it may concern:*

Be it known that I, JOSEPH CARL WEBSTER, a citizen of the United States, residing in the city and county of Philadelphia, State of Pennsylvania, have invented a new and useful Improvement in Solder for Soldering Aluminium, of which the following is a specification.

My composition consists of the following ingredients, namely: lead, tin, aluminium, and zinc, and in combining the same for hard solder that is used for heavy work I combine them in the following proportions, namely: I melt together five (5) parts of tin, four (4) parts of lead, and then add to this six (6) parts of melted aluminium. I then add one (1) part of zinc and after mixing the same thoroughly pour the composition in molds and allow the same to harden. For small or lighter work I vary the proportions in the following manner: six (6) parts of tin, five (5) parts of lead, four (4) parts of aluminium, and one (1) part of zinc.

The above compositions form an alloy which melts at a considerably lower temperature than the aluminium or parts to be soldered, and I find that no flux or scraping of the aluminium to remove the oxid is required and that the oxid that forms on the aluminium will not affect the joining of the metals or parts when the proper heat is obtained. It is understood, of course, that the last-named composition melts at a lower temperature and is preferable for light and delicate work.

In employing this solder it is understood that the usual brazing-fire of gas and air for imparting a high heat is used and into which the aluminium or part to be soldered is placed, it being advisable to avoid having too much back heat from the bricks. The parts to be soldered are heated until the outer surfaces brighten or slightly soften. It is best to keep the solder near the flame, so that when a joint is heated sufficiently the solder is ready to melt and drop thereon in sufficient quantities to solder the same, after which a small paddle is used to smooth over the joint. It is of course understood that if the aluminium should get too hot it should be allowed to cool for about one minute. When the joint is finished, it should be allowed to cool slowly—that is to say, it should not be placed in water, for a quick cooling is apt to crack the soldered joints. I have found that after a joint is cooled and finished it has the appearance of pure aluminium and will not oxidize or tarnish.

Having thus described my invention, what I claim as new, and desire to secure by Letters Patent, is—

The herein-described solder for soldering aluminium, which consists, respectively, of from five to six parts of tin, four to five parts of lead, six to four parts of aluminium, and one part of zinc, as described.

JOSEPH C. WEBSTER.

Witnesses:
 JOHN A. WIEDERSHEIM,
 C. D. MCVAY.